United States Patent
Hao et al.

(10) Patent No.: US 9,967,366 B2
(45) Date of Patent: May 8, 2018

(54) INTERNET OF THINGS (IOT) API PLATFORM

(71) Applicant: Verizon Patent and Licensing Inc., Arlington, VA (US)

(72) Inventors: Jianxiu Hao, Acton, MA (US); Zhong Chen, Acton, MA (US); Matthew J. Threefoot, Columbia, MD (US); Thierry R. Sender, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 14/803,337

(22) Filed: Jul. 20, 2015

(65) Prior Publication Data

US 2017/0026488 A1    Jan. 26, 2017

(51) Int. Cl.
*H04L 29/08* (2006.01)
*H04L 12/24* (2006.01)

(52) U.S. Cl.
CPC .............. *H04L 67/32* (2013.01); *H04L 67/10* (2013.01); *H04L 67/28* (2013.01); *H04L 41/0293* (2013.01)

(58) Field of Classification Search
None
See application file for complete search history.

(56) References Cited

U.S. PATENT DOCUMENTS

| | | | | |
|---|---|---|---|---|
| 9,602,482 | B1* | 3/2017 | Roth | H04L 63/08 |
| 2012/0144501 | A1* | 6/2012 | Vangpat | H04L 63/108 |
| | | | | 726/28 |
| 2013/0007225 | A1* | 1/2013 | Gage | H04L 29/06 |
| | | | | 709/219 |
| 2014/0337955 | A1* | 11/2014 | Mendelovich | H04L 63/0807 |
| | | | | 726/9 |
| 2016/0094611 | A1* | 3/2016 | Chow | H04L 67/02 |
| | | | | 709/203 |

* cited by examiner

*Primary Examiner* — Kevin Bates
*Assistant Examiner* — Lesa Kennedy

(57) ABSTRACT

A first network device receives a token request from an application and, in response, generates a token that includes a time-stamp and a server identifier. The server identifier indicates a particular proxy server, of a group of proxy servers, in an API management layer. A second network device receives, from an application, an API call that includes the token and validates the token. The second network device routes the API call to the particular proxy server indicated by the token in response to successfully validating the token. The first network device or second network device provides a bypass uniform resource locator (URL), to the application, to bypass the API management layer, for one or more types of designated API calls.

20 Claims, 8 Drawing Sheets

INTERNET OF THINGS (IOT) API PLATFORM

BACKGROUND

The Internet of Things (IoT) connects many types of devices over a network. The devices (or "things") in the IoT can be a location tag, a connected thermostat, a monitoring camera, a sensor device, or anything that communicates data over an Internet connection. Devices in the IoT usually have a way to connect to the Internet to report data to other devices and request/receive information from other devices. Devices may connect to the Internet in many ways, such as through a fixed Wi-Fi connection, a Bluetooth connection, a direct wireless network connection (e.g., 3G, 4G or 5G standards), or a proprietary connection to a wireless networks.

DETAILED DESCRIPTION OF PREFERRED EMBODIMENTS

The following detailed description refers to the accompanying drawings. The same reference numbers in different drawings may identify the same or similar elements.

Systems and methods provided herein provide for Internet of Things (IoT) application programming interface (API) management. The systems and methods allow an API gateway to be a distributed service architecture, allowing some API calls to bypass the API gateway for better system performance and optimization.

According to an implementation described herein, a first network device in a "front door" system of an API management layer may receive a token request from an application and, in response, may generate a token that includes a time-stamp and a server identifier. The server identifier may indicate a particular proxy server, of a group of proxy servers, in an API management layer. A second network device in an orchestration system of the API management layer may receive, from an application, an API call that includes the token and validates the token. The second network device may route the API call to the particular proxy server indicated by the token when the validation is successful. The first network device or second network device may provide a bypass uniform resource locator (URL), to the application, to bypass the API management layer, for one or more particular types of data-intensive API calls.

Figure 1:
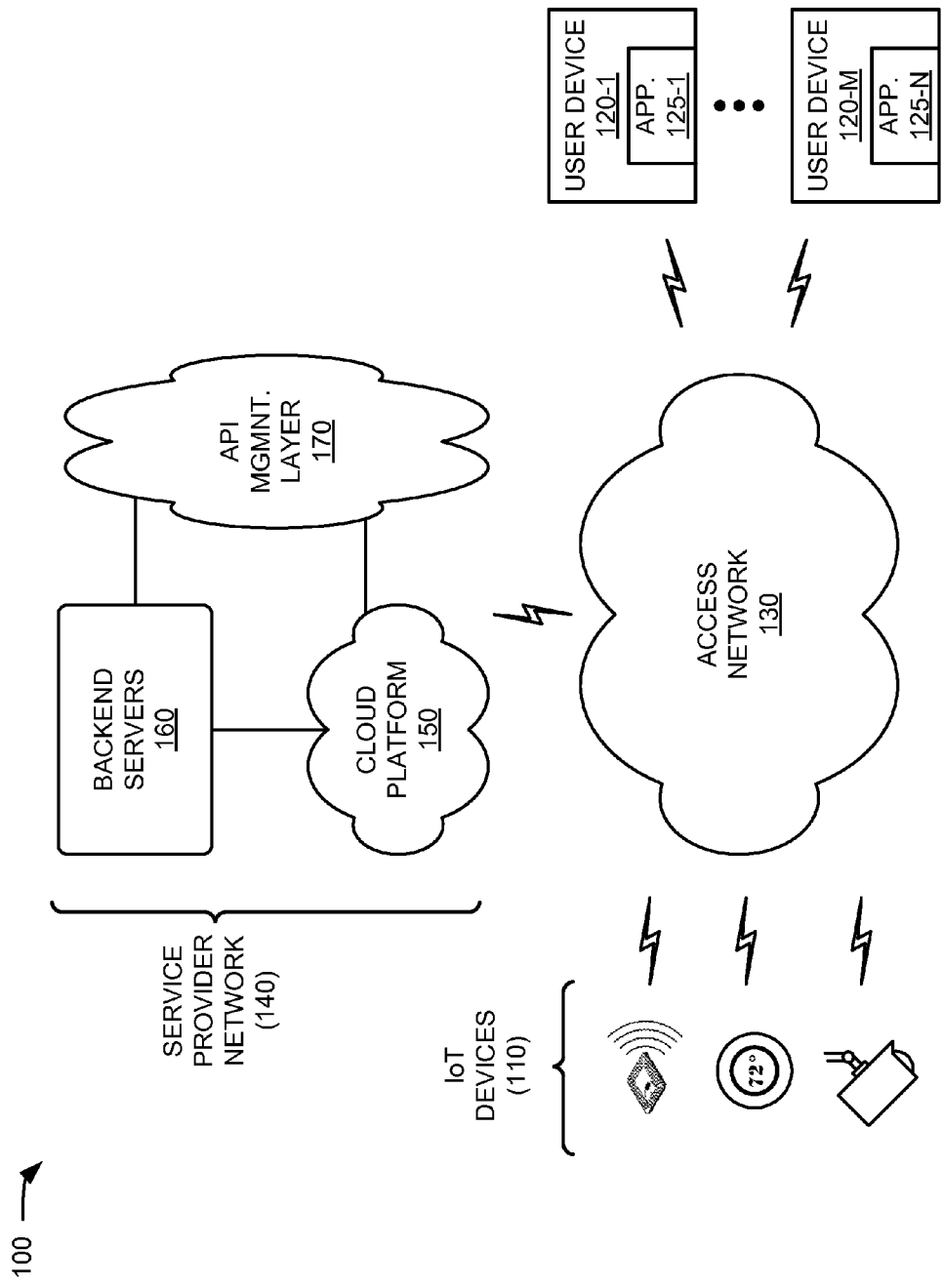
FIG. 1 is a diagram illustrating an exemplary network in which systems and/or methods described herein may be implemented.

FIG. 1 is a diagram illustrating an exemplary network environment 100 in which systems and/or methods described herein may be implemented. As illustrated, network environment 100 may include IoT devices 110 (collectively "IoT devices 110" and singularly "IoT device 110"), user devices 120-1 through 120-M (collectively "user devices 120" and singularly "user device 120") with applications 125-1 through 125-N (collectively "applications 125" and singularly "applications 125"), an access network 130, and a service provider network 140 that includes a cloud platform 150, backend servers 160, and an API management layer 170. Components of network environment 100 may be connected via wired and/or wireless links.

IoT device 110 may include a variety of devices that can communicate with other devices in network environment 100. Examples of IoT device 110 include a location tag, an activity monitor, a connected thermostat, a monitoring camera, a sensor device, or anything that has an Internet connection. In one implementation, IoT device 110 may connect to the Internet to report data or request information from cloud platform 150. IoT device 110 may also listen to and/or be paged from devices via access network 130. IoT device 110 typically has one or more specific functions to perform, such as measuring, monitoring, and/or reporting data. IoT device 110 may connect to access network 130 in different ways, such as via a fixed Wi-Fi connection, a Bluetooth connection, a direct wireless network connection (e.g., a cellular connection using 3G, 4G or 5G standards), or a proprietary connection to a wireless network. While a few IoT devices 110 are shown in FIG. 1, in practice there may be hundreds of thousands or millions of IoT devices 110.

User device 120 may include a computational or communication device. User device 120 may enable a user to control or otherwise communicate with IoT devices 110. For example, user device 120 may include a personal computer (e.g., a laptop or desktop PC), a tablet computer, a smart phone, an Internet-enable television (e.g., a smart TV), a set-top box (STB), a gaming system, or another type of computational or communication device that can communicate with devices in network environment 100. In one implementation, user device 120 may include one or more applications 125 to access data from and manage IoT devices 110 via access network 130 and service provider network 140. According to implementations described herein, applications 125 in user device 120 may employ standardized API calls that enable software developers to build a variety of applications that permit interaction with IoT devices 110.

Access network 130 may include a network that permits transfer of data between IoT device 110, user devices 120, and service provider network 140. Access network 130 may include, for example, a telecommunications network (e.g., a Public Switched Telephone Network (PSTN)), wired (e.g., Ethernet) and/or wireless local area network(s) (LAN) (e.g., Wi-Fi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Additionally, access network 130 may include, among other things, a firewall, a filtering mechanism, a proxy, and/or network address translation mechanisms. Although shown as a single element in FIG. 1, access network 150 may include a number of separate networks that function to provide services to IoT device 110 and user devices 120.

Service provider network 140 may include one or more wired, wireless and/or optical networks that are capable of receiving and transmitting data, voice and/or video signals, including multi-media signals that may include voice, data and video information (generally referred to herein as "services"). Service provider network 140 may include a wide area network (WAN), a metropolitan area network (MAN), an ad hoc network, an intranet, a satellite based network, a fiber optic-based network, and/or a combination of these or other types of networks. Service provider network 120 may include an IP network or a multiprotocol label switching (MPLS) network implementing an Interior Gateway Protocol (IGP) or another protocol that implements a minimum cost end-to-end path for routing between nodes.

Cloud platform 150 may include network devices, computing devices, and other equipment to provide over-the-top (OTT) services, including services for customers with IoT devices 110. In one implementation, cloud platform 150 may include components for authentication and provisioning, device profiles, a rules engine, and messaging. The authentication and provisioning component may perform a provisioning process for an IoT device 110 including authentication, registration, and activation in service provider network 140. The device profiles component may store device profiles and related information for each IoT device 110 or groups of IoT devices 110. The rules engine component may allow users (e.g., of user devices 120) to define the rules for each IoT device 110 or a group of IoT devices 110. These rules can be used for backend services provided by backend servers 160 or on IoT device 110 configuration. For the latter, rules can be pushed to the corresponding IoT device 110 for configuration. The messaging component may communicate messages from IoT devices 110 to front door applications in API management layer 170, from applications on user devices 120 to IoT devices 110, or between IoT devices 110 and devices in cloud platform 150.

Backend servers 160 may include network devices, computing devices, and other equipment. In one implementation, backend servers 160 may include servers for profile and user account management, billing, finance and settlement, and notification. The profile and user account management server may store basic user information, such as a login, user email, contact address, user preferences, etc., for sharing with applications. The billing server may control the process that charges a user for buying, renting, or subscribing to a service (such as a video catalog). The finance and settlement server may include cost assurance and revenue assurance. Cost assurance is to make sure partners (such as studio the content provider) are paid according to their contract. Revenue assurance is to make sure consumers paid their bills according to their purchases, rentals or subscriptions. Notification server provides notices (e.g., as initiated by other backend servers) via email or messaging.

API management layer 170 (also referred to herein as "API gateway 170") may include a distributed network environment to perform a variety of functions relating to security, API management, developer tasks, metrics, service orchestration, proxy services, and/or application development. Security functions may include user authentication, application authentication, and/or additional network-based authentication. API management functions may include privacy control, throttling, and enabling testing accounts on productions. Developer task functions may include providing user and account management, security management (e.g., tokens, certificates, etc.), resources (e.g., tutorials, documentation, etc.), support forums, test sandboxes, and sample applications. Developer task functions may be provided, for example, through a developer portal. Metrics functions may include tracking API and system usage and providing analytics on user systems and transactions. Service orchestration functions may include service integration by aggregating calls, API customization or reformatting, and API optimization using a local cache. Proxy service functions may include hiding backend complexity, unifying developer experiences, and API sharing between applications. Application development functions may include providing a common framework, sample code, and a developer portal for application developers.

In operation, applications 125 enable a user to view and control IoT devices 110. A level of services for IoT devices 110 may vary for different customers. At a lowest level of service, access network 130 provides connectivity between IoT devices 110 and applications 125. At a middle level of service, access network 130 and service provider network 140 may provide connectivity and some storage and/or messaging services. At a highest level of service, access network 130 and service provider network 140 may provide connectivity, storage and/or messaging services, and an API gateway 170 for third-party applications, such as applications 125, using APIs from service provider network 140. Systems and methods described herein relate primarily to this highest level of services.

In FIG. 1, the particular arrangement and number of components of network environment 100 are illustrated for simplicity. In practice, there may be more IoT devices 110, user devices 120, access networks 130, service provider networks 140, cloud platforms 150, backend servers 160, and API gateways 170. For example, there may be hundreds of thousands or millions of IoT devices 110.

Figure 2:
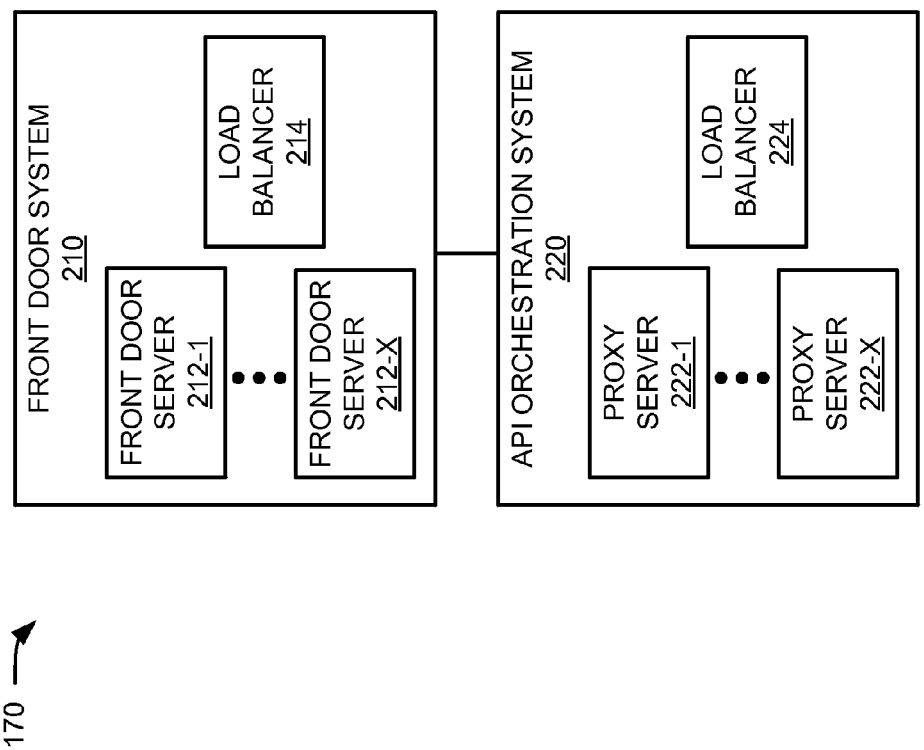
FIG. 2 is a diagram illustrating exemplary components of the API gateway of FIG. 1.

FIG. 2 is a diagram illustrating exemplary components of API gateway 170. As shown in FIG. 2, API gateway 170 may include a front door system 210 and an API orchestration system 220.

Front door system 210 may include network devices and or server devices to manage initial communications for API calls from applications 125. Front door system 210 may include front door servers 212-1 through 212-X (collectively "front door servers 212" and singularly "front door server 212") and a load balancer 214.

Front door server 212 includes one or more network devices, or other types of computation or communication devices, to verify that API requests meets policy controls for service provider network 140. For example, front door server 212 will screen requests for malicious input and issue tokens to applications that are used to balance API workloads. Front door server 212 may also receive load/capacity information from devices in API orchestration system 220 to assign proxy server identifiers for available servers in API orchestration system 220. According to implementations described herein, proxy server identifiers may be provided to applications 125 (and eventually load balancer 224 and/or cloud platform 150) via tokens.

Load balancer 214 may include one or more network devices, or other types of computation or communication devices, to receive requests for API services (e.g., from applications 125) and load balance the requests over devices in front door system 210). For example, load balancer 214 may forward a received services request to one of multiple redundant front door servers 212 in front door system 210 based on available resources (e.g., processing time), geography, cost metrics, etc.

API orchestration system 220 may include network devices and or server devices to respond to API calls from applications 125. API orchestration system 220 may include proxy servers 222-1 through 222-Y (collectively "proxy servers 222" and singularly "proxy server 22") and a load balancer 224.

Proxy server 222 may include one or more network devices, or other types of computation or communication devices, to provide proxy services for API management. Proxy server 222 may receive API calls from applications 125 and may provide responses to the API calls. In one implementation, proxy servers 222 may conduct communications with other devices in cloud platform 150 and/or backend servers 160 to respond to the API calls. Proxy servers 222 may hide backend complexity from applications, permit API sharing between applications, and allow for a unified developer experience.

Load balancer 224 may include one or more network devices, or other types of computation or communication devices, to receive API calls from applications 125 and load balance the calls or requests over proxy servers 222 in API orchestration system 220. For example, load balancer 224 may forward an API call to one of proxy servers 222 based on instructions in tokens received from applications 125.

Figure 3:
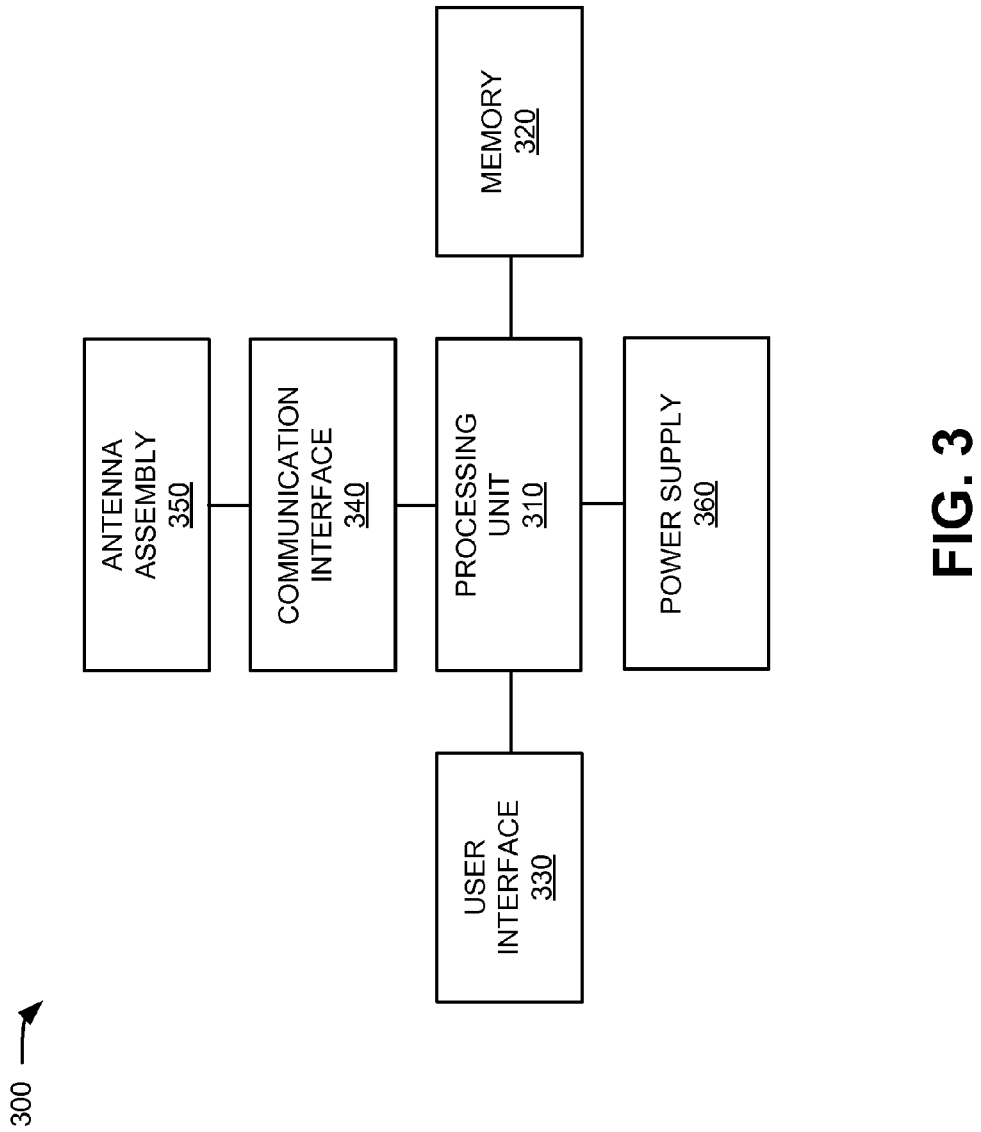
FIG. 3 is a block diagram illustrating exemplary components of a device that may correspond to one or more of the IoT devices of FIG. 1.

FIG. 3 is a diagram illustrating exemplary components of a device 300, according to an implementation described herein. In one implementation, an IoT device 110 may be implemented as a combination of hardware and software on one or more of devices 300. As shown in FIG. 3, device 300 may include a processing unit 310, a memory 320, a user interface 330, a communication interface 340, an antenna assembly 350, and a power supply 360.

Processing unit 310 may include one or more processors, microprocessors, application specific integrated circuits (ASICs), field programmable gate arrays (FPGAs), and/or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 300 to vibrate; a sensor; and/or any other type of input or output device. When device 300 is an IoT device 110, user interface 300 may include limited or no user interface options.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals. Communication interface 340 may include a logical component that includes input and/or output ports, input and/or output systems, and/or other input and output components that facilitate the transmission of data to other devices. For example, communication interface 340 may include a network interfaces for wired communications and/or a wireless network interfaces (e.g., Wi-Fi) for wireless communications. Communication interface 340 may also include a universal serial bus (USB) port for communications over a cable, a Bluetooth™ wireless interface, a radio-frequency identification (RFID) interface, a near-field communication (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

Power supply 360 may include one or more batteries or other portable power source components used to supply power to components of device 300. Power supply 360 may also include control logic to control application of power from an external power source (e.g., a charger) to one or more components of device 300.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently-arranged components, or additional components than those depicted in FIG. 3. Additionally or alternatively, one or more components of device 300 may perform the tasks described as being performed by one or more other components of device 300.

Figure 4:
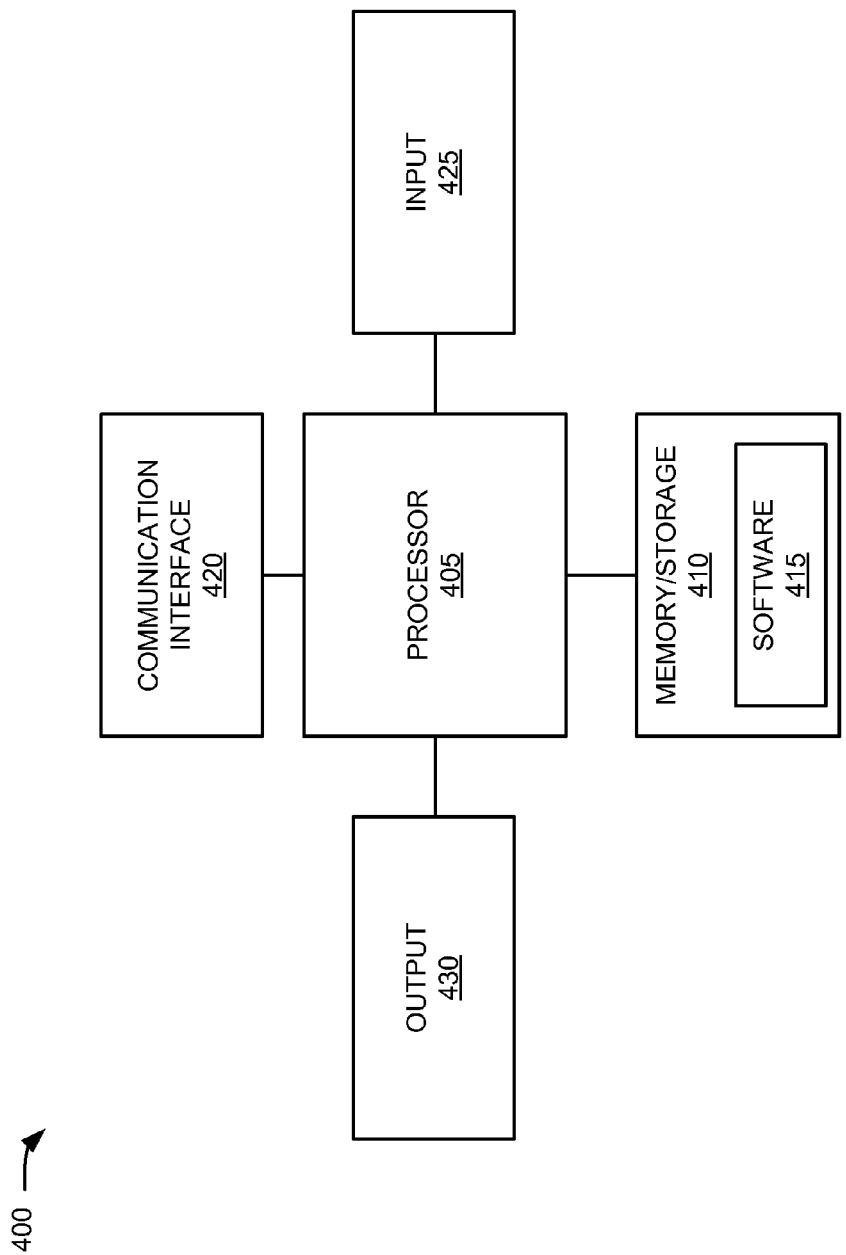
FIG. 4 is a block diagram illustrating exemplary components of a device that may correspond to one or more of the devices of FIG. 1.

FIG. 4 is a diagram illustrating exemplary components of a device 400 that may correspond to one or more of user devices 120, and devices in access network 130 and service provider network 140 in the environments described herein. As illustrated, according to an implementation, device 400 includes a processor 405, memory/storage 410 that stores software 415, a communication interface 420, an input 425, and an output 430. According to other implementations, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., cache, etc.), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a computer program that provides a function and/or a process. Software 415 may include firmware. For example, with reference to user device 120, software 415 may include an application that, when executed by processor 405, provides the ability to configure and/or control IoT devices 110, as described herein.

Communication interface 420 permits device 400 to communicate with other devices, networks, systems, etc. Communication interface 420 may include one or multiple wireless interfaces and/or wired interfaces. Communication interface 420 may include one or multiple transmitters and receivers or transceivers. Communication interface 420 may include one or multiple antennas. Communication interface 420 may operate according to a protocol, layers (e.g., radio resource control (RRC), packet data convergence control (PDCC), non-access stratum (NAS), etc.) and a communication standard (e.g., Long-term Evolution (LTE), etc.).

Input 425 permits an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 permits an output from device 400. For example, output 430 may include a speaker, a display, a touchscreen, a touchless screen, a light, an output port, and/or some other type of visual, auditory, tactile, etc., output component.

Device 400 may perform a process and/or a function, as described herein, in response to processor 405 executing software 415 stored by memory/storage 410. By way of example, instructions may be read into memory/storage 410 from another memory/storage 410 (not shown) or read from another device (not shown) via communication interface 420. The instructions stored by memory/storage 410 may cause processor 405 to perform a process described herein. Alternatively, for example, according to other implementations, device 400 may perform a process described herein based on the operation of hardware (processor 405, etc.).

Figure 5:
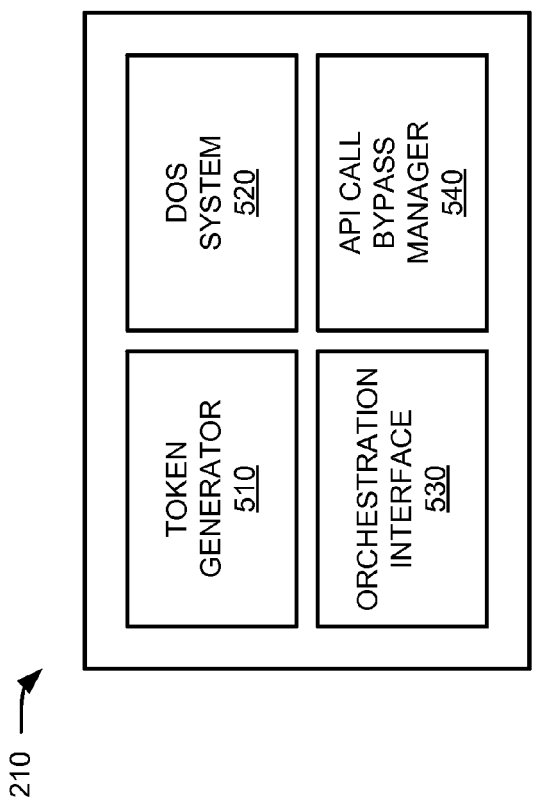
FIG. 5 is a block diagram of exemplary functional components of the front door system of FIG. 2 according to an implementation described herein.

FIG. 5 is a block diagram illustrating exemplary functional components of front door system 210. As shown in FIG. 5, front door system 210 may include a token generator 510, a denial of service (DOS) system 520, an orchestration interface 530, and an API call bypass manager 540.

Token generator 510 may generate a token to be provided to applications 125. The token may include multiple parts, including a time stamp, a server identifier, and additional information. The time stamp may identify an origination time of the token. The origination time may be used to detect expired or over-used tokens. The server identifier may provide an identifier for a particular proxy server 222, which can be used to handle all (or, as described further herein, all non-data-intensive) API calls from a particular application 125. The additional information may include user profile information, application information, a uniform resource locator (URL) for API orchestration system 220, or other information that may be required to respond to an API call. In one implementation, token generator 510 may generate a hash value for the token based on the time stamp, the server ID, and/or the user profile information. In one implementation, the hash value for the token may be generated using a one-way hash algorithm, such as MD5, SHA-1, SHA-256, etc.

Denial of service system 520 will check the client IP address to make sure that a token request from application 125 is within an acceptance time window. Particularly, denial of service system 520 may ensure multiple token requests from the same application are not serviced within a short interval. Multiple token requests within a short interval may be indicative of a malicious purpose. Denial of service system 520 may block future token requests, for a period of time, from an application using a particular IP address to submit multiple token requests within a short time period.

Orchestration interface 530 may communicate with API orchestration system 220 to determine capacity and availability of proxy severs 222 to handle API calls. Orchestration interface 530 may provide the capacity/availability information to token generator 510 for use in assigning server identifiers in the tokens.

API call bypass manager 540 may identify particular APIs that are data-intensive. Data-intensive APIs may include heavy content transfer data calls, such as streaming video, uploading or downloading a video file, etc. Data-intensive APIs may be designated, for example, by the service provider (e.g., a network administrator of service provider network 140) and, in some instances, may vary based on a level of service that a customer has subscribed to. API call bypass manager 540 may assign a bypass URL to the data-intensive APIs and provide the bypass URL to applications 125 (directly or via another functional component). The bypass URL may provide a link to, for example, cloud platform 150, to allow application 125 to bypass API gateway 170 for particular types (e.g., data-intensive) API calls. In other implementations, API calls that may be associated with bypass URLs may include APIs with particular low-latency requirements and/or API calls from customers with particular types of service level agreements.

Figure 6:
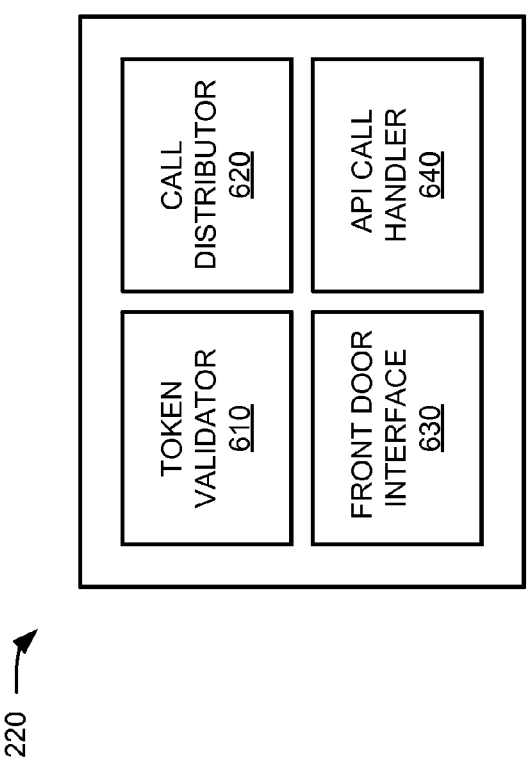
FIG. 6 is a block diagram of exemplary functional components of the API orchestration system of FIG. 2 according to an implementation described herein.

FIG. 6 is a block diagram illustrating exemplary functional components of API orchestration system 220. As shown in FIG. 6, API orchestration system 220 may include a token validator 610, a call distributor 620, a front door interface 630, and an API call handler 640.

Token validator 610 may validate tokens received with API calls from applications 125. Token validator 610 may check the time stamp portion of the token to make sure the token is not expired and/or to make sure the token is not being used repeatedly within the same time window. Additionally, token validator 610 may run a one-way hash algorithm (e.g., the same algorithm used by token generator 510) or communicate with front door system 210 to validate the token.

Call distributor 620 may direct incoming API calls from applications 125 to proxy servers 222. Each proxy server 222 in API orchestration system 220 may have a set of server identifiers, and any server identifier belongs to only one proxy server. Call distributor 620 will route the API call to the particular proxy server 222, within API orchestration system 220, that was assigned with the server identifier in the token. Call distributor 620 may also monitor to determine if a server identifier included in a token is available (e.g., the designated server in the token is still on-line). If the server identifier is not valid or the server is not available, call distributor 620 may assign a different proxy server 222 or redirect application 125 to the URL of front door system 210 to obtain another token. The server identifier in the token enables all subsequent API calls associated with the token to go through the same proxy server 222 for as long as the token remains valid. Use of the same proxy server 222 for API calls from the same application 125 allows for better server optimization, including improved cache management.

Front door interface 630 may communicate with front door system 210 to provide capacity and availability information for proxy severs 222 to handle API calls. For example, front door interface 630 may monitor the group of proxy servers 222 in API orchestration system 220 to determine a workload of each proxy server 222 and an availability to accept API calls from another application 125. API call handler 640 may receive API calls from applications 125 and may provide responses to the API calls.

Although FIGS. 5 and 6 show exemplary functional components of front door system 210 and API orchestration system 220, in other implementations the functional components associated with either or both of front door system 210 or API orchestration system 220 may performed by other devices of front door system 210 or API orchestration system 220.

Figure 7:
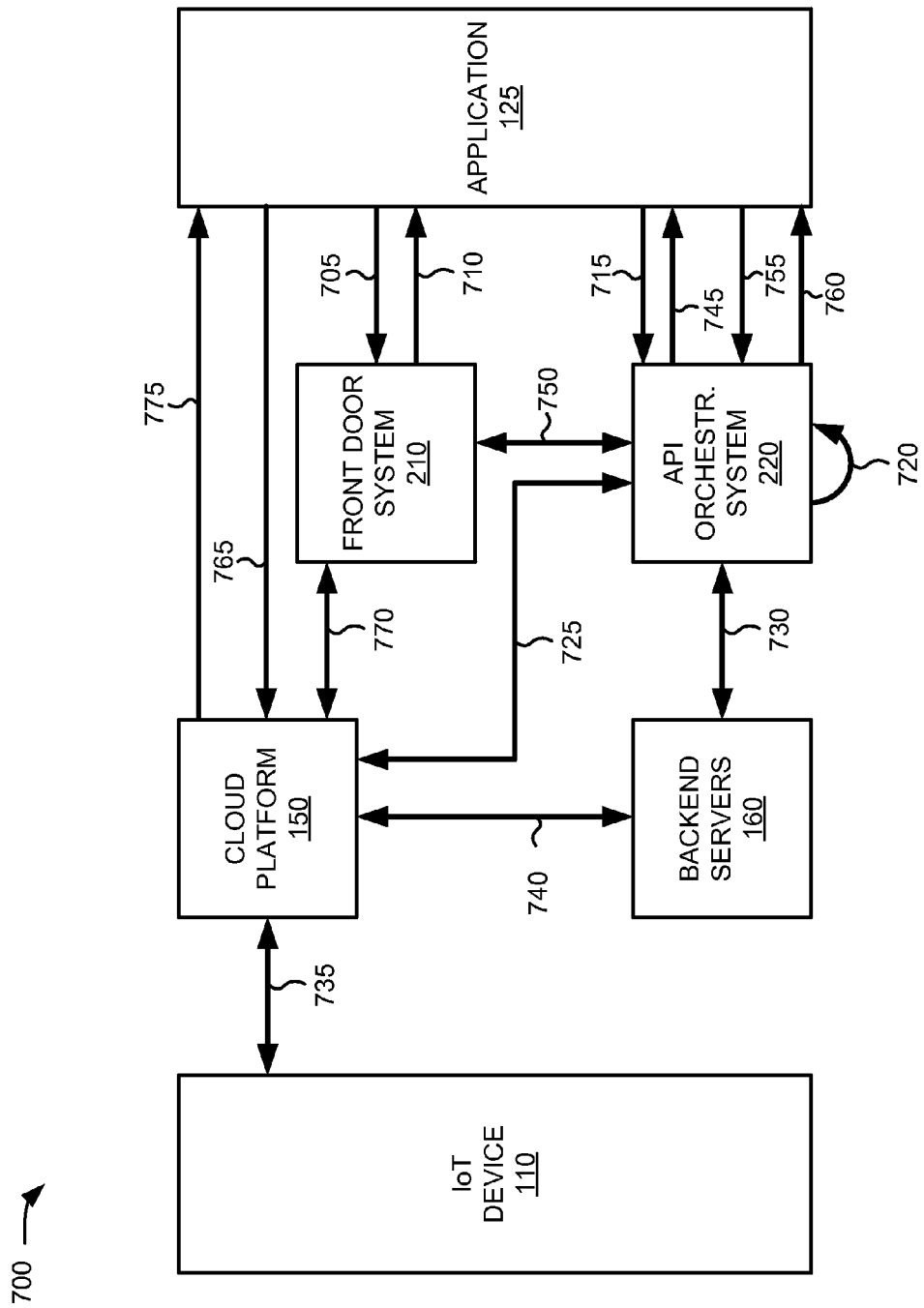
FIG. 7 is a block diagram illustrating exemplary communications between devices in a portion of the network of FIG. 1.

FIG. 7 is a diagram of exemplary communications for a portion 700 of network environment 100. Communications in FIG. 7 may represent communications to manage IoT APIs, according to an implementation described herein. More particularly, the communications of FIG. 7 may enable user devices 110 to implement an API gateway that provides needed security, load balancing, and other features, while providing the ability to bypass the API gateway when necessary for best system performance and optimization. As shown in FIG. 7, network portion 700 may include IoT device 110, application 125, cloud platform 150, backend servers 160, front door system 210, and API orchestration system 220. IoT device 110, application 125, cloud platform 150, backend servers 160, front door system 210, and API orchestration system 220 may include functionality described above in connection with, for example, FIGS. 1-6.

Referring to FIG. 7, IoT application 125 may submit a request 705 to front door system 210 for a token. Front door system 210 may verify that request 705 meets policy controls. For example, front door system 210 will check the client IP address to make sure request 705 is not outside an acceptance time window. If an IP address generates too many requests within the time window, the IP address is most likely associated with a malicious client, and denial of services (DOS) protections should be turned on for that IP address for a period of time. The acceptance time window and the DOS protection period may be controlled, for example, from a policy engine (not shown) in service provider network 140.

Assuming request 705 is not outside the acceptance time window, front door system 210 may generate a token 710 and return token 710 back to application 125. As described above in connection with FIG. 5, token 710 may include multiple parts, including a time stamp, a server identifier, and user profile information. In one implementation, front door system 210 may encrypt or generate a hash value for token 710.

Application 125 may receive token 710 and may submit an API call with the token to API orchestration system 220, as indicated by reference 715. API orchestration system 220 may validate the token. To validate the token, API orchestration system 220 may check the time stamp portion of the token to make sure it has not expired. Additionally, API orchestration system 220 may run the same one-way hash algorithm or communicate with front door system 210 to validate the token. If the token is expired, is not valid, or is not included in API call 715, then API orchestration system 220 may redirect application 125 to the URL of front door system 210 to obtain a valid token.

Assuming the token with AP call 715 is validated, API orchestration system 220 may load balance 720 the API calls using information from the token. More particularly, the server ID included in token 710 is used for load balancing. Each server in API orchestration system 220 may have a set of server IDs, and any server ID belongs to only one server. The API call associated with the token can be routed to the particular proxy server 222, within API orchestration system 220, that was assigned the server ID. The proxy server 222 may manage the API call by initiating communications 725 with cloud platform 150 and/or communications 730 with backend servers 160. Cloud platform 150 may, in turn, conduct communications 735 with IoT device 110 and/or communications 740 with backend servers 160 to provide a response 745 to API call 715, via API orchestration system 745.

Communications 750 between front door system 210 and API orchestration system 220 may also be conducted in response to request 705, API call 715, and/or as needed. Communications 750 may include communications to validate a token (e.g., token 710), verify a hash algorithm to use in validating the token, or exchange secret information for hash algorithms, if any. Communications 750 may also include relaying loads and capacity of servers (e.g., proxy server 222) in API orchestration system 220 to make sure front door system 210 generates server IDs of tokens according to the server load so that the load balancer 224 of API orchestration system 220 can route future traffic in a balanced manner.

In most cases, assuming application 125 has a valid token, a subsequent API call 755 from application 125 may be directed directly to API orchestration system 220. API orchestration system 220 may validate the token and direct API call 755 to the same proxy server 222 as was used for API call 715, based on the server ID in the token. API orchestration system 220 may initiate communications similar to communications 725/730/735/740 described above to provide a response 760 to API call 755.

However, for some API calls (e.g., heavy content transfer data calls, such as streaming video, uploading or downloading a video file, etc.), it is preferable to not go through front door system 210 or API orchestration system 220. Instead, API gateway 170 may direct application 125 to bypass API orchestration system 220 and route particular types of data calls directly to an appropriate application server (e.g., in cloud platform 150). In one implementation, a URL for cloud platform 150 (or a particular application server within cloud platform 150) may be provided for each type of data-intensive API call to enable application 125 to direct data-intensive API calls differently than other API calls. The URL associated with the data-intensive API calls may be provided by front door system 210 as part of token 710. Alternatively, the URL associated with the data-intensive API calls may be provided by API orchestration system 220 as part of response 740. In still other implementations, the URL associated with the data-intensive API calls may be included in the standardized API format provided to developers.

Thus, as shown in FIG. 7, application 125 may send a data-intensive API call 765, including a valid token 710, directly to cloud platform 150. Cloud platform 150 may validate the token, using the one way hash algorithm from front door system 210 or by requesting validation from front door system 210, as shown in reference 770. By initiating communications directly with cloud platform 150, application 125 may eliminate the need for communications with API orchestration system 220. Instead, cloud platform 150 may initiate communications similar to communications 735 and 740 described above to provide a response 775 to API call 765.

Figure 8:
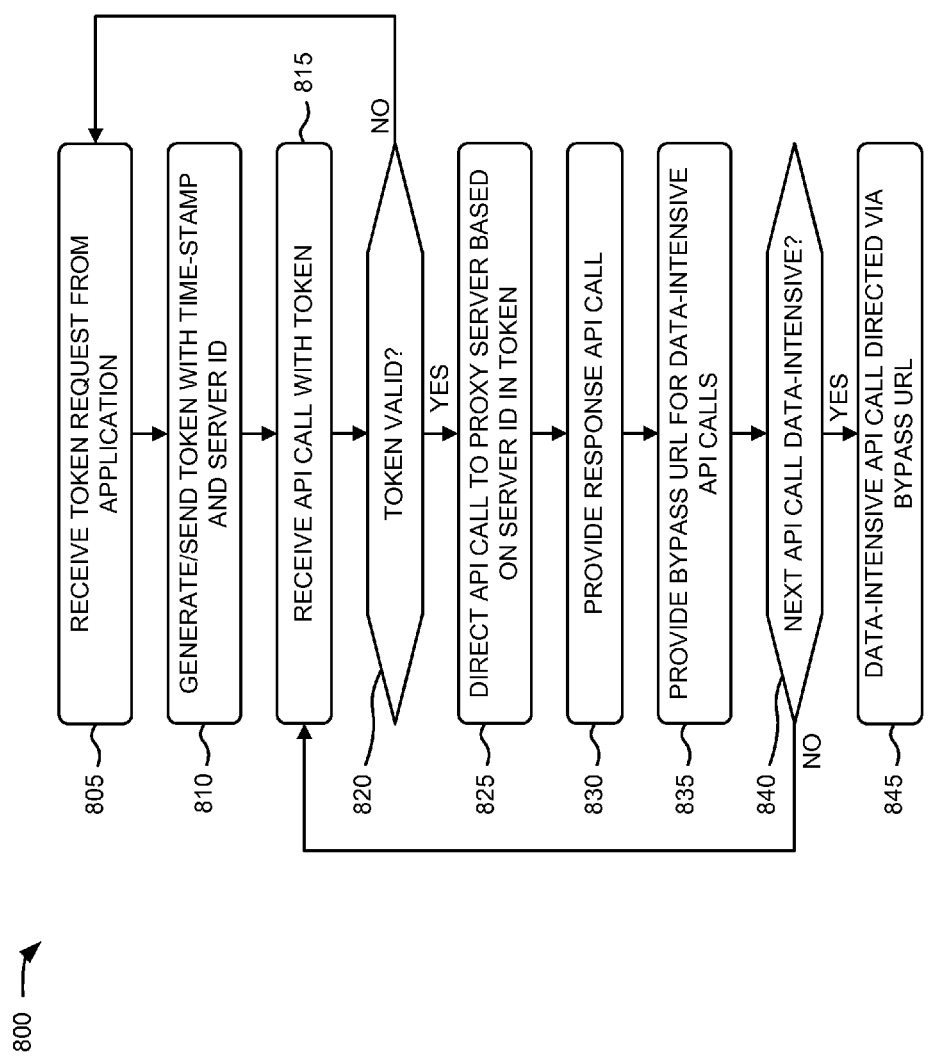
FIG. 8 is a flow diagram of an exemplary process for using distributed service architecture in an API management system, according to an implementation described herein.

FIG. 8 provides a flow diagram of an exemplary process 800 for to managing IoT APIs in a distributed environment. In one implementation, process 800 may be performed by API gateway 170. In another implementation, some or all of process 800 may be performed by another device or group of devices, including or excluding devices in API gateway 170.

As shown in FIG. 8, process 800 may include receiving a token request from an application (block 805) and generating and sending a token with a time-stamp and server identifier (block 810). For example, front door system 210 of API gateway 170 may receive a token request from application 125 (e.g., that is being executed on user device 110). In response to the token request, front door system 210 may generate a token (e.g., token 710) and send the token to application 125.

Process 800 may also include receiving an API call with the token (block 815) and determining if the token is valid (block 820). For example, API orchestration system 220 of API gateway 170 may receive an API call from application 125 with the token that was previously issued by front door system 210. API orchestration system 220 may validate the token by checking if the timestamp is with an allowed time period and verifying a hash value in the token.

If the token is not valid or not received within the allocated time period (block 820—NO), process 800 may direct application back to front door system 210 to obtain a valid token (block 805). For example, API orchestration system 220 may provide a URL for front door system 210 to allow application 125 to request a new token. If the token is valid and received within the allocated time period (block 820—YES), process 800 may direct the API call to a proxy server based on the server identifier in the token (block 825). For example, API orchestration system 220 may verify that proxy server 222, associated with the server identifier in the token, is on-line or available and direct the API call to proxy server 222.

Process 800 may also include providing a response to the API call (block 830) and providing a bypass URL for data-intensive API calls (block 835). For example, proxy server 222 in API orchestration system 220 may handle the API call, including, for example, providing services such as aggregation, reformatting, and/or caching. Proxy server 222 may conduct backend communications with cloud platform 150 or backend servers 160 to obtain data, such as raw or processed data from IoT devices 110. API orchestration system 220 may provide, to application 125, a list of particular API calls that are to be treated as data-intensive, along with a corresponding bypass URL to use for the data intensive-API calls. In one implementation, front door system 210 may provide the list of particular API calls to application 125 along with a token (e.g., token 710). In another implementation, API orchestration system 220 may provide the list of particular API calls to application 125 along with (or prior to) a response to a first API call from application 125. Thus, one or more different URLs may be provided to application 125 for directing data-intensive API calls directly to cloud platform 150 without going through API gateway 170.

Process 800 may also include determining if a next API call is data-intensive (block 840). For example, application 125 may determine if a particular API call is one of the data-intensive API calls in the list that API gateway 170 previously provided.

If the next API call is not data-intensive (block 840—NO), then process 800 may return to process block 815 to receive the next API call. For example, application 125 may send another API call with the same previously-obtained token to API orchestration system 220. If the next API call is data-intensive (block 840—YES), the data-intensive API call may be directed to the bypass URL (block 845). For example, application 125 may send the data intensive-API call directly to cloud platform 150 via the bypass URL.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a first network device in an application programming interface (API) management layer of a service provider network, a token request from an application on a user device;
   monitoring, by the first network device, a group of proxy servers in the API management layer to determine workloads of the group of proxy servers in the API management layer;
   generating, in response to the token request, a token that includes a time-stamp and a server identifier, the server identifier indicating a particular proxy server, of the group of proxy servers and the server identifier being assigned to balance the workloads among the group of proxy servers;
   sending, by the first network device and to the application, the token;
   receiving, from the application and by a second network device in the API management layer, an API call that includes the token;
   validating, by the second network device, the token;
   routing, by the second network device, the API call to the particular proxy server indicated by the token in response to successfully validating the token; and
   providing, to the application, a bypass uniform resource locator (URL), to bypass the API management layer, for one or more types of designated API calls, wherein use of the bypass URL requires separate validation using the token.

2. The method of claim 1, further comprising:
   receiving, at a third network device in a cloud platform layer and from the application via the bypass URL, one of the one or more types of designated API calls and the token;
   validating, by the third network device, the token; and
   providing, by the third network device and to the application, a response to the one of the one or more types of designated API calls.

3. The method of claim 1, wherein providing the bypass URL includes sending the bypass URL with the token.

4. The method of claim 1, wherein providing the bypass URL includes sending the bypass URL to the application after validating the token.

5. The method of claim 1, wherein the token includes a hash value that is generated using a one-way hash algorithm.

6. The method of claim 5, wherein validating the token includes:
   comparing the time stamp with an expiration period for the token, and
   applying the one-way hash algorithm.

7. The method of claim 1, further comprising:
   redirecting the application to a URL for the first network device when the validating is not successful.

8. The method of claim 1, further comprising:
   receiving, by the second network device, another API call that includes the token but does not correspond to one of the one or more types of designated API calls;
   validating, by the second network device, the token; and
   directing the API call to the particular proxy server indicated in the token when the validating is successful.

9. The method of claim 1, further comprising:
   verifying, by the second network device and after receiving the API call, an availability of the particular proxy server corresponding to the server identifier.

10. The method of claim 1, further comprising:
    providing, by the particular proxy server and to the application, a response to the API call.

11. A system, comprising:
    a front-door system for an API management layer including:
      a network interface to communicate with one or more remote systems,
      one or more first memories to store instructions, and
      one or more first processors configured to execute instructions in the one or more memories to:
        receive a token request from an application,
        monitor a group of proxy servers in the API management layer to determine workloads of the group of proxy servers in the API management layer,
        generate a token that includes a time-stamp and a server identifier, the server identifier indicating a particular proxy server, of the group of proxy servers and the server identifier being assigned to balance the workloads among the group of proxy servers,
        send, to the application, the token, and provide, to the application, a bypass uniform resource locator (URL), to bypass the API management layer, for one or more types of data-intensive API calls, wherein use of the bypass URL requires separate validation using the token; and an API orchestration system for the API management layer including:
a second network interface to communicate with the one or more remote systems,
one or more second memories to store instructions, and
one or more second processors configured to execute instructions in the one or more second memories to:
receive an API call, that includes the token, from the application,
validate the token, and
route the API call to the particular proxy server indicated by the token in response to successfully validating the token.

12. The system of claim 11, further comprising:
a cloud platform to:
receive, from the application and via the bypass URL, one of the one or more types of data-intensive API calls and the token;
validate the token; and
provide, to the application, a response to the one of the one or more types of data-intensive API calls.

13. The system of claim 12, wherein providing the bypass URL includes sending the bypass URL with the token.

14. The system of claim 11, wherein the token includes a hash value that is generated using a one-way hash algorithm.

15. The system of claim 11, wherein validating the token includes:
comparing the time stamp with an expiration period for the token.

16. The system of claim 11, wherein the one or more second processors of the API orchestration system are further configured to execute instructions in the one or more second memories to:
redirect the application to a URL for the front-door system when the validating is not successful.

17. The system of claim 11, wherein the one or more second processors of the API orchestration system are further configured to execute instructions in the one or more memories to:

verify, after receiving the API call, an availability of the particular proxy server corresponding to the server identifier.

18. A non-transitory computer-readable medium including instructions, executed by one or more processors, for causing the one or more processors to:
receive a token request from an application;
monitor a group of proxy servers in an API management layer to determine workloads of the group of proxy servers in the API management layer;
generate, in response to the token request, a token that includes a time-stamp and a server identifier, the server identifier indicating a particular proxy server, of the group of proxy servers and the server identifier being assigned to balance the workloads among the group of proxy servers;
send, to the application, the token;
receive, from the application, an API call that includes the token;
validate the token;
route the API call to the particular proxy server indicated by the token when the validating is successful; and
provide, to the application, a bypass uniform resource locator (URL), to bypass the API management layer, for one or more particular types of data-intensive API calls, wherein use of the bypass URL requires separate validation using the token.

19. The non-transitory computer-readable medium of claim 18, further comprising instructions for causing the one or more processors to:
receive another API call that includes the token but does not correspond to one of the one or more particular types of data-intensive API calls;
validate the token; and
route the API call to the particular proxy server indicated in the token in response to successfully validating the token.

20. The non-transitory computer-readable medium of claim 18, further comprising instructions for causing the one or more processors to:
receive, from the application and via the bypass URL, one of the one or more particular types of data-intensive API calls and the token;
validate the token; and
provide, to the application, a response to the one of the one or more particular types of data-intensive API calls.

* * * * *